(12) United States Patent
Schaffner et al.

(10) Patent No.: US 11,186,431 B2
(45) Date of Patent: Nov. 30, 2021

(54) MODULAR BULK MATERIAL CONTAINER

(71) Applicant: Halliburton Energy Services, Inc., Houston, TX (US)

(72) Inventors: Austin Carl Schaffner, Duncan, OK (US); Wesley John Warren, Marlow, OK (US); Bryan Chapman Lucas, Duncan, OK (US); Calvin L. Stegemoeller, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/308,945

(22) PCT Filed: Jul. 28, 2016

(86) PCT No.: PCT/US2016/044496
§ 371 (c)(1),
(2) Date: Dec. 11, 2018

(87) PCT Pub. No.: WO2018/022064
PCT Pub. Date: Feb. 1, 2018

(65) Prior Publication Data
US 2019/0241356 A1    Aug. 8, 2019

(51) Int. Cl.
*B65D 88/32*    (2006.01)
*B65D 88/30*    (2006.01)
(Continued)

(52) U.S. Cl.
CPC .......... *B65D 88/32* (2013.01); *B65D 88/129* (2013.01); *B65D 88/30* (2013.01); *B65D 88/54* (2013.01); *B65G 65/40* (2013.01)

(58) Field of Classification Search
CPC .... B65D 88/027; B65D 88/129; B65D 88/30; B65D 88/32; B65D 88/54; B65G 65/40
See application file for complete search history.

(56) References Cited

U.S. PATENT DOCUMENTS 710,611 A    10/1902   Ray
917,646 A    4/1909   Newey
(Continued)

FOREIGN PATENT DOCUMENTS

CA    2764734 A1    1/2011
EP    0006027 B1    12/1983
(Continued)

OTHER PUBLICATIONS

International Search Report and Written Opinion issued in related PCT Application No. PCT/US2016/044496 dated Apr. 18, 2017, 16 pages.

(Continued)

*Primary Examiner* — James Keenan
(74) *Attorney, Agent, or Firm* — John Wustenberg; Baker Botts L.L.P.

(57) ABSTRACT

In accordance with presently disclosed embodiments, systems and methods for efficiently managing bulk material and dry additives to be mixed with bulk material in a blender are provided. The disclosed systems include a modular portable container that can be used to hold multiple types of dry flowable material for transportation about a work site. The different types of dry materials can be selectively released from the modular container for mixing with liquid and bulk material in a blender. The modular container generally includes a base structure that supports a number of individual, separable, and fully enclosed compartments. The compartments may each hold a different type of dry material, and the compartments may be arranged onto the base structure adjacent one another and removably secured to the base structure so that the compartments can be transported as a single unit about the work site.

20 Claims, 5 Drawing Sheets

(51) Int. Cl.
  *B65D 88/12* (2006.01)
  *B65G 65/40* (2006.01)
  *B65D 88/54* (2006.01)

(56) References Cited

U.S. PATENT DOCUMENTS

| | | | |
|---|---|---|---|
| 1,519,153 A | 9/1923 | Mitton |
| 1,726,603 A | 9/1929 | Allen |
| 1,795,987 A | 3/1931 | Adams |
| 2,231,911 A | 2/1941 | Hitt et al. |
| 2,281,497 A | 4/1942 | Hyson et al. |
| 2,385,245 A | 9/1945 | Willoughby |
| 2,415,782 A | 2/1947 | Zadmach |
| 2,513,012 A | 6/1950 | Dugas |
| 2,563,470 A | 8/1951 | Kane |
| 2,652,174 A | 9/1953 | Shea |
| 2,670,866 A | 3/1954 | Glesby |
| 2,678,737 A | 5/1954 | Mangrum |
| 2,759,737 A | 8/1956 | Manning |
| 2,802,603 A | 8/1957 | McCray |
| 2,867,336 A | 1/1959 | Soldini et al. |
| 3,049,248 A | 8/1962 | Heltzel et al. |
| 3,083,879 A | 4/1963 | Coleman |
| 3,151,779 A | 10/1964 | Rensch et al. |
| 3,203,370 A | 8/1965 | Haug et al. |
| 3,217,927 A | 11/1965 | Bale, Jr. et al. |
| 3,318,473 A | 5/1967 | Jones et al. |
| 3,326,572 A | 6/1967 | Murray |
| 3,343,688 A | 9/1967 | Ross |
| 3,354,918 A | 11/1967 | Coleman |
| 3,380,333 A | 4/1968 | Clay et al. |
| 3,404,963 A | 10/1968 | Fritsche et al. |
| 3,410,530 A | 11/1968 | Gilman |
| 3,432,151 A | 3/1969 | O'Loughlin et al. |
| 3,467,408 A | 9/1969 | Regalia |
| 3,476,270 A | 11/1969 | Cox et al. |
| 3,602,400 A | 8/1971 | Cooke |
| 3,627,555 A | 12/1971 | Driscoll |
| 3,698,693 A | 10/1972 | Poncet |
| 3,785,534 A | 1/1974 | Smith |
| 3,802,584 A | 4/1974 | Sackett, Sr. et al. |
| 3,986,708 A | 10/1976 | Heltzel et al. |
| 4,023,719 A | 5/1977 | Noyon |
| 4,058,239 A | 11/1977 | Van Mill |
| 4,138,163 A | 2/1979 | Calvert et al. |
| 4,178,117 A | 12/1979 | Brugler |
| 4,204,773 A | 5/1980 | Bates |
| 4,248,337 A | 2/1981 | Zimmer |
| 4,258,953 A | 3/1981 | Johnson |
| 4,313,708 A | 2/1982 | Tiliakos |
| 4,395,052 A | 7/1983 | Rash |
| 4,398,653 A | 8/1983 | Daloisio |
| 4,423,884 A | 1/1984 | Gevers |
| 4,544,279 A | 10/1985 | Rudolph |
| 4,548,507 A | 10/1985 | Mathis et al. |
| 4,583,663 A | 4/1986 | Bonerb |
| 4,626,166 A | 12/1986 | Jolly |
| 4,701,095 A | 10/1987 | Berryman et al. |
| 4,806,065 A | 2/1989 | Holt et al. |
| 4,850,702 A | 7/1989 | Arribau et al. |
| 4,856,681 A | 8/1989 | Murray |
| 4,900,157 A | 2/1990 | Stegemoeller et al. |
| 4,919,540 A | 4/1990 | Stegemoeller et al. |
| 4,956,821 A | 9/1990 | Fenelon |
| 4,993,883 A | 2/1991 | Jones |
| 4,997,335 A | 3/1991 | Prince |
| 5,036,979 A | 8/1991 | Selz |
| 5,096,096 A | 3/1992 | Calaunan |
| 5,114,169 A | 5/1992 | Botkin et al. |
| 5,149,192 A | 9/1992 | Hamm et al. |
| 5,303,998 A | 4/1994 | Whitlatch et al. |
| 5,339,996 A | 8/1994 | Dubbert et al. |
| 5,343,813 A | 9/1994 | Septer |
| 5,375,730 A | 12/1994 | Bahr et al. |
| 5,401,129 A | 3/1995 | Eatinger |
| 5,413,154 A | 5/1995 | Hurst, Jr. et al. |
| 5,426,137 A | 6/1995 | Allen |
| 5,441,321 A | 8/1995 | Karpisek |
| 5,443,350 A | 8/1995 | Wilson |
| 5,445,289 A | 8/1995 | Owen |
| 5,590,976 A | 1/1997 | Kilheffer et al. |
| 5,609,417 A | 3/1997 | Otte |
| 5,722,552 A | 3/1998 | Olson |
| 5,772,390 A | 6/1998 | Walker |
| 5,806,441 A | 9/1998 | Chung |
| 5,913,459 A | 6/1999 | Gill et al. |
| 5,915,913 A | 6/1999 | Greenlaw et al. |
| 5,927,356 A | 7/1999 | Henderson |
| 5,944,470 A | 8/1999 | Bonerb |
| 5,997,099 A | 12/1999 | Collins |
| 6,059,372 A | 5/2000 | McDonald et al. |
| 6,112,946 A | 9/2000 | Bennett et al. |
| 6,126,307 A | 10/2000 | Black et al. |
| 6,193,402 B1 | 2/2001 | Grimland et al. |
| 6,247,594 B1 | 6/2001 | Garton |
| 6,379,086 B1 | 4/2002 | Goth |
| 6,425,627 B1 | 7/2002 | Gee |
| 6,491,421 B2 | 12/2002 | Rondeau et al. |
| 6,517,232 B1 | 2/2003 | Blue |
| 6,536,939 B1 | 3/2003 | Blue |
| 6,537,015 B2 | 3/2003 | Lim et al. |
| 6,568,567 B2 | 5/2003 | McKenzie et al. |
| 6,622,849 B1 | 9/2003 | Sperling |
| 6,655,548 B2 | 12/2003 | McClure, Jr. et al. |
| 6,876,904 B2 | 4/2005 | Oberg et al. |
| 6,915,815 B1 * | 7/2005 | Ness ............... B65D 19/44 137/259 |
| 6,980,914 B2 | 12/2005 | Bivens et al. |
| 7,008,163 B2 | 3/2006 | Russell |
| 7,086,342 B2 | 8/2006 | O'Neall et al. |
| 7,100,896 B1 | 9/2006 | Cox |
| 7,114,905 B2 | 10/2006 | Dibdin |
| 7,252,309 B2 | 8/2007 | Soon et al. |
| 7,284,579 B2 | 10/2007 | Elgan |
| 7,451,015 B2 | 11/2008 | Mazur et al. |
| 7,475,796 B2 | 1/2009 | Garton |
| 7,500,817 B2 | 3/2009 | Furrer et al. |
| 7,513,280 B2 | 4/2009 | Brashears et al. |
| 7,665,788 B2 | 2/2010 | Dibdin et al. |
| 7,762,281 B2 | 7/2010 | Schuld |
| 7,997,213 B1 | 8/2011 | Gauthier et al. |
| 8,387,824 B2 | 3/2013 | Wietgrefe |
| 8,434,990 B2 | 5/2013 | Claussen |
| D688,349 S | 8/2013 | Oren et al. |
| D688,350 S | 8/2013 | Oren et al. |
| D688,351 S | 8/2013 | Oren et al. |
| D688,772 S | 8/2013 | Oren et al. |
| 8,505,780 B2 | 8/2013 | Oren |
| 8,545,148 B2 | 10/2013 | Wanek-Pusset et al. |
| 8,573,917 B2 | 11/2013 | Renyer |
| 8,585,341 B1 * | 11/2013 | Oren ............... B65D 88/26 414/411 |
| 8,607,289 B2 | 12/2013 | Brown et al. |
| 8,616,370 B2 | 12/2013 | Allegretti et al. |
| 8,622,251 B2 | 1/2014 | Oren |
| 8,662,525 B1 | 3/2014 | Dierks et al. |
| 8,668,430 B2 | 3/2014 | Oren et al. |
| D703,582 S | 4/2014 | Oren |
| 8,827,118 B2 | 9/2014 | Oren |
| 8,834,012 B2 | 9/2014 | Case et al. |
| 8,887,914 B2 | 11/2014 | Allegretti et al. |
| RE45,713 E | 10/2015 | Oren et al. |
| 9,162,603 B2 | 10/2015 | Oren |
| RE45,788 E | 11/2015 | Oren et al. |
| 9,248,772 B2 | 2/2016 | Oren |
| RE45,914 E | 3/2016 | Oren et al. |
| 9,296,518 B2 | 3/2016 | Oren |
| 9,340,353 B2 | 5/2016 | Oren et al. |
| 9,358,916 B2 | 6/2016 | Oren |
| 9,394,102 B2 | 7/2016 | Oren et al. |
| 9,403,626 B2 | 8/2016 | Oren |
| 9,421,899 B2 | 8/2016 | Oren |
| 9,428,330 B2 * | 8/2016 | Lopez ............... B65D 88/027 |
| 9,440,785 B2 | 9/2016 | Oren et al. |

(56) References Cited

U.S. PATENT DOCUMENTS

| | | | |
|---|---|---|---|
| 9,446,801 B1 | 9/2016 | Oren | |
| 9,475,661 B2 | 10/2016 | Oren | |
| 9,511,929 B2 | 12/2016 | Oren | |
| 9,522,816 B2 | 12/2016 | Taylor | |
| 9,527,664 B2 | 12/2016 | Oren | |
| 9,580,238 B2 | 2/2017 | Friesen et al. | |
| RE46,334 E | 3/2017 | Oren et al. | |
| 9,617,065 B2 | 4/2017 | Allegretti et al. | |
| 9,617,066 B2 | 4/2017 | Oren | |
| 9,624,030 B2 | 4/2017 | Oren et al. | |
| 9,624,036 B2 | 4/2017 | Luharuka et al. | |
| 9,643,774 B2 | 5/2017 | Oren | |
| 9,650,216 B2 | 5/2017 | Allegretti | |
| 9,656,799 B2 | 5/2017 | Oren et al. | |
| 9,669,993 B2 | 6/2017 | Oren et al. | |
| 9,670,752 B2 | 6/2017 | Glynn et al. | |
| 9,676,554 B2 | 6/2017 | Glynn et al. | |
| 9,682,815 B2 | 6/2017 | Oren | |
| 9,694,970 B2 | 7/2017 | Oren et al. | |
| 9,701,463 B2 | 7/2017 | Oren et al. | |
| 9,718,609 B2 | 8/2017 | Oren et al. | |
| 9,718,610 B2 * | 8/2017 | Oren | B65D 88/30 |
| 9,725,233 B2 | 8/2017 | Oren et al. | |
| 9,725,234 B2 | 8/2017 | Oren et al. | |
| 9,738,439 B2 | 8/2017 | Oren et al. | |
| RE46,531 E | 9/2017 | Oren et al. | |
| 9,758,081 B2 | 9/2017 | Oren | |
| 9,758,082 B2 * | 9/2017 | Eiden, III | B65D 88/32 |
| 9,758,993 B1 | 9/2017 | Allegretti et al. | |
| 9,771,224 B2 | 9/2017 | Oren et al. | |
| 9,783,338 B1 | 10/2017 | Allegretti et al. | |
| 9,796,319 B1 | 10/2017 | Oren | |
| 9,796,504 B1 | 10/2017 | Allegretti et al. | |
| 9,809,381 B2 | 11/2017 | Oren et al. | |
| 9,828,135 B2 | 11/2017 | Allegretti et al. | |
| 9,840,366 B2 | 12/2017 | Oren et al. | |
| 9,969,564 B2 | 5/2018 | Oren et al. | |
| 9,988,182 B2 | 6/2018 | Allegretti et al. | |
| 10,059,246 B1 | 8/2018 | Oren | |
| 10,081,993 B2 | 9/2018 | Walker et al. | |
| 10,093,451 B2 * | 10/2018 | Blitz | B65D 90/24 |
| 10,189,599 B2 | 1/2019 | Allegretti et al. | |
| 10,207,753 B2 | 2/2019 | O'Marra et al. | |
| 10,287,091 B2 | 5/2019 | Allegretti | |
| 10,308,421 B2 | 6/2019 | Allegretti | |
| 10,486,854 B2 | 11/2019 | Allegretti et al. | |
| 10,518,828 B2 | 12/2019 | Oren et al. | |
| 10,604,338 B2 | 3/2020 | Allegretti | |
| 2002/0121464 A1 | 9/2002 | Soldwish-Zoole et al. | |
| 2003/0159310 A1 | 8/2003 | Hensley et al. | |
| 2004/0008571 A1 | 1/2004 | Coody et al. | |
| 2004/0031335 A1 | 2/2004 | Fromme et al. | |
| 2004/0206646 A1 | 10/2004 | Goh et al. | |
| 2004/0258508 A1 | 12/2004 | Jewell | |
| 2005/0219941 A1 | 10/2005 | Christenson et al. | |
| 2006/0013061 A1 | 1/2006 | Bivens et al. | |
| 2007/0014185 A1 | 1/2007 | Diosse et al. | |
| 2007/0201305 A1 | 8/2007 | Heilman et al. | |
| 2008/0187423 A1 | 8/2008 | Mauchle | |
| 2008/0294484 A1 | 11/2008 | Furman et al. | |
| 2009/0078410 A1 | 3/2009 | Krenek et al. | |
| 2009/0129903 A1 | 5/2009 | Lyons, III | |
| 2009/0292572 A1 | 11/2009 | Alden et al. | |
| 2009/0314791 A1 | 12/2009 | Hartley et al. | |
| 2010/0196129 A1 | 8/2010 | Buckner | |
| 2010/0278621 A1 | 11/2010 | Redekop | |
| 2010/0319921 A1 | 12/2010 | Eia et al. | |
| 2012/0017812 A1 | 1/2012 | Renyer et al. | |
| 2012/0018093 A1 | 1/2012 | Zuniga et al. | |
| 2012/0037231 A1 | 2/2012 | Janson | |
| 2012/0152798 A1 | 6/2012 | Allegretti et al. | |
| 2012/0181093 A1 | 7/2012 | Fehr et al. | |
| 2012/0219391 A1 | 8/2012 | Teichrob et al. | |
| 2013/0048148 A1 | 2/2013 | Matye | |
| 2013/0128687 A1 | 5/2013 | Adams | |
| 2013/0135958 A1 | 5/2013 | O'Callaghan | |
| 2013/0142601 A1 | 6/2013 | McIver et al. | |
| 2013/0206415 A1 | 8/2013 | Sheesley | |
| 2013/0284729 A1 | 10/2013 | Cook et al. | |
| 2014/0023463 A1 | 1/2014 | Oren | |
| 2014/0044508 A1 | 2/2014 | Luharuka et al. | |
| 2014/0076569 A1 | 3/2014 | Pham et al. | |
| 2014/0083554 A1 | 3/2014 | Harris | |
| 2014/0216736 A1 | 8/2014 | Leugemors et al. | |
| 2014/0305769 A1 | 10/2014 | Eiden, III et al. | |
| 2014/0377042 A1 | 12/2014 | McMahon | |
| 2015/0003955 A1 | 1/2015 | Oren et al. | |
| 2015/0016209 A1 | 1/2015 | Barton et al. | |
| 2015/0183578 A9 | 7/2015 | Oren et al. | |
| 2015/0191318 A1 | 7/2015 | Martel | |
| 2015/0203286 A1 | 7/2015 | Ness | |
| 2015/0284194 A1 | 10/2015 | Oren et al. | |
| 2015/0353293 A1 | 12/2015 | Richard | |
| 2015/0360856 A1 | 12/2015 | Oren et al. | |
| 2015/0366405 A1 | 12/2015 | Manchuliantsau | |
| 2015/0368052 A1 | 12/2015 | Sheesley | |
| 2015/0375930 A1 | 12/2015 | Oren et al. | |
| 2016/0031658 A1 | 2/2016 | Oren et al. | |
| 2016/0039433 A1 | 2/2016 | Oren et al. | |
| 2016/0046438 A1 | 2/2016 | Oren et al. | |
| 2016/0046454 A1 | 2/2016 | Oren et al. | |
| 2016/0052670 A1 | 2/2016 | Skeid et al. | |
| 2016/0068342 A1 | 3/2016 | Oren et al. | |
| 2016/0130095 A1 | 5/2016 | Oren et al. | |
| 2016/0244279 A1 | 8/2016 | Oren et al. | |
| 2016/0264352 A1 | 9/2016 | Oren | |
| 2016/0332809 A1 | 11/2016 | Harris | |
| 2016/0332811 A1 | 11/2016 | Harris | |
| 2017/0021318 A1 | 1/2017 | McIver et al. | |
| 2017/0123437 A1 | 5/2017 | Boyd et al. | |
| 2017/0129696 A1 | 5/2017 | Oren | |
| 2017/0144834 A1 | 5/2017 | Oren et al. | |
| 2017/0190523 A1 | 7/2017 | Oren et al. | |
| 2017/0203915 A1 | 7/2017 | Oren | |
| 2017/0217353 A1 | 8/2017 | Vander Pol et al. | |
| 2017/0217671 A1 | 8/2017 | Allegretti | |
| 2017/0225883 A1 | 8/2017 | Oren | |
| 2017/0240350 A1 | 8/2017 | Oren et al. | |
| 2017/0240361 A1 | 8/2017 | Glynn et al. | |
| 2017/0240363 A1 | 8/2017 | Oren | |
| 2017/0267151 A1 | 9/2017 | Oren | |
| 2017/0283165 A1 | 10/2017 | Oren et al. | |
| 2017/0313497 A1 | 11/2017 | Schaffner et al. | |
| 2017/0320660 A1 | 11/2017 | Sanders et al. | |
| 2017/0349226 A1 | 12/2017 | Oren et al. | |
| 2018/0002120 A1 | 1/2018 | Allegretti et al. | |
| 2018/0257814 A1 | 9/2018 | Allegretti et al. | |
| 2019/0009231 A1 | 1/2019 | Warren et al. | |
| 2019/0111401 A1 | 4/2019 | Lucas et al. | |
| 2020/0062448 A1 | 2/2020 | Allegretti et al. | |

FOREIGN PATENT DOCUMENTS

| | | |
|---|---|---|
| EP | 2937826 A1 | 10/2015 |
| GB | 2066220 A | 7/1981 |
| GB | 2204847 A1 | 11/1988 |
| JP | 2008239019 A | 10/2008 |
| WO | 2008012513 A2 | 1/2008 |
| WO | 2013095871 A1 | 6/2013 |
| WO | 2013142421 A1 | 9/2013 |
| WO | 2014018129 A1 | 1/2014 |
| WO | 2014/028321 A1 | 2/2014 |
| WO | 2014018236 A2 | 5/2014 |
| WO | 2015119799 A1 | 8/2015 |
| WO | 2015191150 A1 | 12/2015 |
| WO | 2015192061 A1 | 12/2015 |
| WO | 2016044012 A1 | 3/2016 |
| WO | 2016160067 A1 | 10/2016 |
| WO | 2016178691 A1 | 11/2016 |
| WO | 2016178692 A1 | 11/2016 |
| WO | 2016178694 A1 | 11/2016 |
| WO | 2016178695 A1 | 11/2016 |
| WO | 2017014768 A1 | 1/2017 |

(56) References Cited

FOREIGN PATENT DOCUMENTS

| WO | 2017014771 A1 | 1/2017 |
| WO | 2017014774 A1 | 1/2017 |
| WO | 2017027034 A1 | 2/2017 |

OTHER PUBLICATIONS

Office Action issued in related Canadian Patent Application No. 2,996,055 dated Oct. 2, 2020, 5 pages.
U.S. Pat. No. 0,802,254A, Oct. 17, 1905, "Can-Cooking Apparatus," John Baker et al.

* cited by examiner

MODULAR BULK MATERIAL CONTAINER

CROSS-REFERENCE TO RELATED APPLICATION

The present application is a U.S. National Stage Application of International Application No. PCT/US2016/044496 filed Jul. 28, 2016, which is incorporated herein by reference in its entirety for all purposes.

TECHNICAL FIELD

The present disclosure relates generally to transferring bulk materials, and more particularly, to a portable container having multiple compartments for holding and releasing different types of dry flowable materials.

BACKGROUND

During the drilling and completion of oil and gas wells, various wellbore treating fluids are used for a number of purposes. For example, high viscosity gels are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the well site as they are needed for the particular treatment. Systems for metering and mixing the various materials are normally portable, e.g., skid- or truck-mounted, since they are needed for only short periods of time at a well site.

The powder or granular treating material (bulk material) is normally transported to a well site in a commercial or common carrier tank truck. Once the tank truck and mixing system are at the well site, the bulk material must be transferred or conveyed from the tank truck into a supply tank for metering into a blender as needed. Well sites typically include one or more supply tanks that are filled pneumatically on location and then connected to the blender through a series of belts (or auger conveyors in some marine applications). The supply tanks provide a large connected capacity of bulk material to be supplied to the blender. Discharge gates on the supply tanks output bulk material from the supply tanks to the conveyors, which then transfer the bulk material to the blender.

Recent developments in bulk material handling operations involve the use of portable containers for transporting dry material about a well location. The containers can be brought in on trucks, unloaded, stored on location, and manipulated about the well site when the material is needed. The containers are generally easier to manipulate on location than a large supply tank trailer. For certain wellbore treatments, it can be desirable to provide large volumes of dry additives for mixing with the bulk material in the blender.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
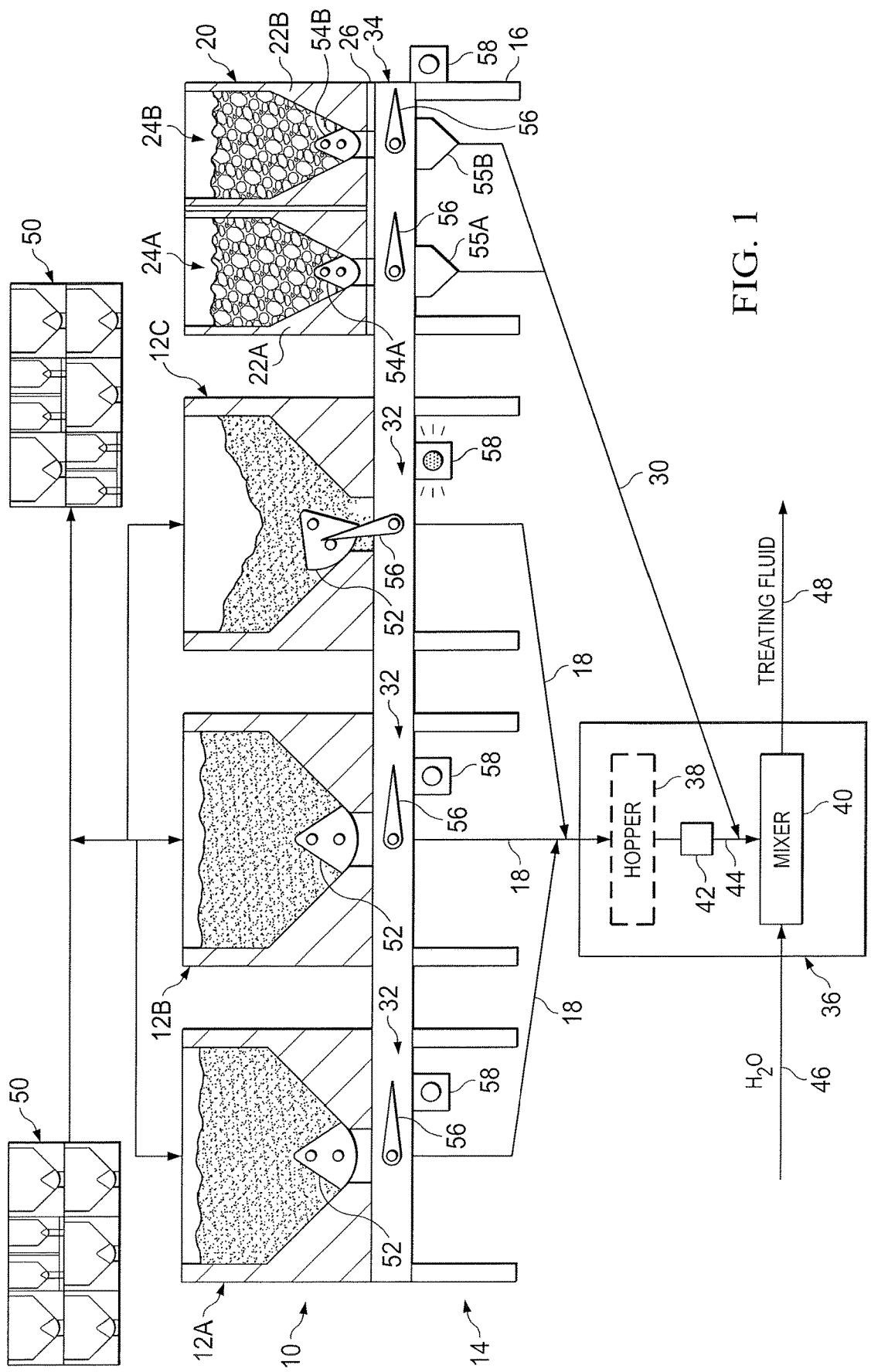
FIG. 1 is a schematic block diagram of a bulk material/dry additive handling system suitable for releasing bulk material and dry additives from portable containers, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for efficiently managing bulk material (e.g., bulk solid or liquid material) and dry additives to be mixed with bulk material in a blender. Bulk material handling systems are used in a wide variety of contexts including, but not limited to, drilling and completion of oil and gas wells, concrete mixing applications, agriculture, and others.

The disclosed systems may include a modular portable container that can be used to hold multiple types of dry flowable material (e.g., bulk material and/or dry additives) for transportation of the material about a work site. The different types of dry materials can be selectively released from the modular container for mixing with liquid and other materials in a blender. The modular container generally includes a base structure that supports a number of individual, separable, and fully enclosed compartments. The compartments may each hold a different type of dry material, and the compartments may be arranged onto the base structure adjacent one another and removably secured to the base structure so that the compartments can be transported as a single unit about the work site. The modular container may be customizable such that any desired combination of compartments holding different dry materials can be added to the base structure. That way, the modular container can supply a custom combination of dry additives or other materials needed for a specific blender job. Each compartment of the modular container may include its own discharge gate for selectively releasing the contents of that compartment to an outlet location.

The disclosed modular container may be used in a containerized material handling system at a work site. For example, the modular container may be used to supply multiple types of dry additive to a blender unit that also receives a large quantity of bulk material from other portable containers. The blender unit may mix the dry additive from the modular container with bulk material provided from one or more portable containers of bulk material. To that end, the system may include a support structure designed to receive one or more portable containers of bulk material and the modular container, one or more outlets used to direct bulk material from the portable containers on the support structure to a first inlet of the blender unit, and one or more additional outlets for directing dry additives from the modular container on the support structure into the blender unit.

The disclosed techniques may be used to efficiently handle any desirable bulk material having a solid or liquid constituency including, but not limited to, sand, proppant, gel particulate, dry-gel particulate, and others. The dry additive may be any flowable dry material. In general, the dry additive may be different from the bulk material being used, including but not limited to diverting agent, breaker material, and others.

In currently existing on-site material handling applications, bulk material (e.g., sand, proppant, gel particulate, or dry-gel particulate) may be used during the formation of treatment fluids. In such applications, the bulk material is often transferred between transportation units, storage tanks, blenders, and other on-site components via pneumatic transfer, sand screws, chutes, conveyor belts, and other components. Recently, a new method for transferring bulk material to a hydraulic fracturing site involves using portable containers to transport the bulk material. The containers can be brought in on trucks, unloaded, stored on location, and manipulated about the site when the material is needed. These containers generally include a discharge gate at the bottom that can be actuated to empty the material contents of the container toward a desired destination, such as a hopper on a blender unit.

With currently existing equipment, there is not an efficient way to handle metering of dry additives into the mixing compartment of the blender unit for combining with the bulk material released from portable containers. Typically, small volume (e.g., around 50 lb) bags of dry additive can be cut and manually lifted over a screw feeder leading to the blender mixing compartment. The dry additive falls from the bag into the hopper and/or is metered via a screw feeder to the blender mixer. In other instances, large volume (e.g., around 2000-3000 lb) super sacs of dry additive can be lifted by a crane or other overhead lifting means and cut to dump the contents into a hopper of a transferring device, then metered to the mixer. These existing methods of introducing dry additive into the blender can generate large amounts of dust as the bags of dry additive are dumped into the hoppers. In addition, the process of cutting, lifting, and dumping from bags may have to be repeated several times throughout the operation. This can be time consuming and distracting for an operator tending the blender unit. The dry additives are also susceptible to adverse weather conditions when added in this manner.

The disclosed systems and methods for providing multiple dry materials in a single modular container may eliminate the shortcomings associated with existing container handling systems. Specifically, the disclosed systems and methods allow multiple different dry additives to be easily introduced into a blender unit, without the material being manually lifted or suspended via a crane over the blender unit. Instead, the dry additives may be disposed in the modular container and positioned on the support structure. An outlet system coupled to the support structure may route the desired dry additives from the modular container to the blender unit. In some embodiments, this transfer of dry additive from the modular container to the second outlet location could be performed at a predetermined or metered flow rate. Since a modular container is used to hold multiple types of dry additives, the same modular container may be positioned on the support structure once and used to output different types of dry additives at different times throughout the blender job. This enables fewer container swaps by a forklift or other hoisting mechanism that is being used to move containers to and from the support structure.

Turning now to the drawings, FIG. 1 is a schematic diagram of a bulk material handling system 10. The system 10 includes one or more bulk material containers 12 elevated on a support structure 14 and holding a quantity of bulk material (e.g., solid or liquid treating material). The containers 12 may each utilize a gravity feed to provide a controlled constant supply of bulk material at an outlet 18. The containers 12 are separate from each other and independently transportable about the job site (e.g., for placement on or removal from the support structure 14).

In addition, the system 10 includes at least one modular container 20 elevated on the support structure 14 and holding at least two types of dry flowable material, which may include dry additive material (e.g., diverter materials, breaker material, etc.) and/or another type of bulk material. The modular container 20 includes at least a first compartment 22A holding a first dry material 24A, a second compartment 22B holding a second dry material 24B, and a base structure 26 supporting the first and second compartments 22. As discussed in greater detail below, the modular container 20 may include one or more additional compartments 22 besides the two that are illustrated in FIG. 1.

The first and second dry materials 24A and 24B may have different properties (e.g., size and/or chemical properties) from each other. In addition, the first and second dry materials 24A and 24B may each have different properties (e.g., size and/or chemical properties) than the bulk material that is carried in and released from the portable containers 12 disposed on the support structure 14.

The modular container 20 may utilize individual gravity feeds corresponding to each compartment 22 to provide a controlled constant supply of the different dry materials 24 at one or more outlets 30. In some embodiments, for example, the system 10 may utilize a single outlet 30 to route the dry material 24 from whichever compartment 22 of the modular container 20 is opened at a given time. In other embodiments, the system 10 may utilize multiple separate outlets 30, one corresponding to each compartment 22 of the modular container 20, to route the different dry materials 24 released from the modular container 20 to a similar outlet location. The modular container 20 holding multiple types of dry material 24 is a separate and portable container assembly that is independently transportable about the job site from the portable bulk material containers 12.

In the illustrated embodiment, the support structure 14 may include a frame 16 for receiving and holding the bulk material containers 12 and the modular container 20, a plurality of gravity feed outlets 18 for directing bulk material away from the respective containers 12, and one or more outlets 30 for directing different dry materials 24 away from the corresponding compartments 22 of the modular container 20. The frame 16 of the support structure 14 may include separate bays 32 each designed to receive and hold a different container 12 of bulk material, as well as an additional bay 34 for receiving and holding the modular container 20. The outlets 18 may be coupled to and extend from the frame 16. The outlets 18 may utilize a gravity feed to provide a controlled constant supply of bulk material from the containers 12 to a first outlet location, such as a bulk material inlet on a blender unit 36. The one or more outlets 30 may utilize a gravity feed and a conveying device to provide a controlled constant supply of dry additives from the modular container 20 to a second outlet location, such as a dry additive inlet on the blender unit 36.

Although shown as just one support structure 14 in FIG. 1, other embodiments of the bulk material handling system 10 may include one or more bulk material containers 12 and/or modular containers 20 disposed on separate support structures 14 that all feed into the blender unit 36. For example, the separate support structures 14 may each hold a single bulk material container 12 or modular container 20. In other embodiments, the support structures 14 may each hold multiple bulk material containers 12 and/or modular containers 20. In still other embodiments, one support structure 14 may hold several bulk material containers 12 while another support structure 14 holds one or more modular containers 20.

As mentioned above, the outlets 18 and 30 may direct bulk material and dry additive, respectively, to the blender unit 36. The blender unit 36 may include a hopper 38 and a mixer 40 (e.g., mixing compartment). The blender unit 36 may also include a metering mechanism 42 for providing a controlled, i.e. metered, flow of bulk material from the hopper 38 to the mixer 40. As illustrated, the outlets 18 may provide the bulk material to the blender hopper 38. However, in other embodiments the blender unit 36 may not include the hopper 38, such that the outlets 18 of the support structure 14 may provide bulk material directly into the mixer 40. As shown, the one or more outlets 30 from the fourth bay 34 may provide a constant supply of dry additive or other dry material to the blender unit 36. The term "dry material" may refer to either dry additive to be mixed into the bulk material from other containers 12 on the support structure or to a different type of bulk material (e.g., 100 mesh) to be supplied to the blender in smaller quantities as compared to the bulk material held in the containers 12. The blender unit 36 may mix dry additive with the bulk material and fluids in the mixer 40. The bulk material and dry additive may be separately metered into a common dry material inlet 44 of the mixer 40.

Water and other additives may be supplied to the mixer 40 (e.g., mixing compartment) through a fluid inlet 46. As those of ordinary skill in the art will appreciate, the fluid inlet 46 may include more than the one input flow line illustrated in FIG. 1. The bulk material, dry additive, and water may be combined in the mixer 40 to produce (at an outlet 48) a hydraulic fracturing fluid, a mixture combining multiple types of proppant, proppant/dry-gel particulate mixture, sand/sand-diverting agents mixture, cement slurry, drilling mud, a mortar or concrete mixture, or any other fluid mixture for use on location. The outlet 48 may be coupled to a pump for transporting the treating fluid to a desired location (e.g., a hydrocarbon recovery well) for a treating process.

It should be noted that the disclosed bulk material containers 12 and modular container 20 may be utilized to provide a bulk material/dry additive mixture for use in a variety of treating processes. For example, the disclosed systems and methods may be utilized to provide proppant materials into fracture treatments performed on a hydrocarbon recovery well. In other embodiments, the disclosed techniques may be used to provide other materials (e.g., non-proppant) for diversions, conductor-frac applications, cement mixing, drilling mud mixing, and other fluid mixing applications.

It should be noted that the disclosed system 10 may be used in other contexts as well. For example, the bulk material/dry additive handling system 10 may be used in concrete mixing operations (e.g., at a construction site) to dispense aggregate from the containers 12 along with other types of aggregate from the compartments 22 of the modular container 20 into a concrete mixing apparatus (blender 36). In addition, the bulk material/dry additive handling system 10 may be used in agriculture applications to dispense grain, feed, seed, or mixtures of the same. Still other applications may be realized for transporting bulk material and multiple dry additives via containers 12 and 20 to an elevated location on a support structure 14 and dispensing the bulk material and dry additives in a metered fashion to an outlet location.

As illustrated, the containers 12 and 20 may be elevated above their outlet locations via the frame 16. The support structure 14 is designed to elevate the containers 12 above the level of the blender inlet (e.g., blender hopper 38 and/or mixing tub 40) to allow the bulk material to gravity feed from the containers 12 to the blender unit 36. This way, the containers 12 are able to sit on the frame 16 of the support structure 14 and output bulk material directly into the blender unit 36 via the gravity feed outlets 18 of the support structure 14. The dry additive outlet(s) 30 are integrated into the support structure 14 to direct the different dry materials 24 from the elevated modular container 20 to the blender unit 36.

In some embodiments, the support structure 14 (with the frame 16, the gravity feed outlets 18, and the dry additive outlet(s) 30) may be integrated into the blender unit 36. In this manner, the system 10 may be a single integrated unit for receiving bulk material containers and modular containers 12 and 20 on the support structure 14, feeding bulk material and dry additive from the containers 12 and 20 to their respective blender inlets, and combining the bulk material and dry additives with one or more fluids at the mixer 40 to produce the treatment fluid.

Although shown as supporting three containers 12 of bulk material and one modular container 20 of multiple dry materials 24, other embodiments of the frame 16 may be configured to support other numbers or combinations of containers 12 and 20. The exact number of containers 12 and 20 that the support structure 14 can hold may depend on a combination of factors such as, for example, the volume, width, and weight of the containers 12 and 20 to be disposed thereon. The bays 32 and 34 may be designed to receive containers 12 of bulk material and modular containers 20 of dry additive having approximately the same container footprint.

In any case, the containers 12 and 20 may be completely separable and transportable from the frame 16, such that any of the containers 12 and 20 may be selectively removed from the frame 16 and replaced with another container 12 (or 20). That way, once the contents from one container 12 (or 20) runs low or empties, a new container 12 (or 20) may be placed on the frame 16 to maintain a steady flow of bulk material or dry additive to the outlet locations. In some instances, a container 12 (or 20) may be closed before being completely emptied, removed from the frame 16, and replaced by a container 12 (or 20) holding a different type of bulk material or dry additive to be provided to the outlet location.

A portable bulk storage system 50 may be provided at the site for storing one or more additional bulk material containers 12 and/or modular containers 20 to be positioned on the frame 16 of the support structure 14. The containers 12 and 20 may be transported to the desired location on a transportation unit (e.g., truck). The bulk storage system 50 may be the transportation unit itself or may be a skid, a pallet, or some other holding area. One or more containers 12 (or 20) may be transferred from the storage system 50 onto the support structure 14. This transfer may be performed by lifting the container 12 (or 20) via a hoisting mechanism, such as a forklift, a crane, or a specially designed container management device.

When the one or more containers 12 of bulk material are positioned on the support structure 14, discharge gates 52 on one or more of the containers 12 may be opened, allowing bulk material to flow from the containers 12 into the respective outlets 18 of the support structure 14. The outlets 18 may then route the flow of bulk material directly to an outlet location (e.g., into the hopper 38 or mixer 40 of the blender unit 36). In addition, when it is desired to provide the first dry material 24A to the blender unit 36, a discharge gate 54A on the corresponding compartment 22A of the modular container 20 may be opened, allowing the dry material 24A to flow from the container 20 into the respective outlet 30 of the support structure 14. As shown, the support structure 14 may include a hopper 55 for each compartment 22 of the modular container 20. The hopper 55A may feed the dry material 24A from the first compartment 22A directly into the corresponding outlet 30. The outlet 30 may then transfer and/or meter the dry material 24A to the blender unit 36 for mixing with the bulk material. Each hopper 55 may include its own metering device, such as a gate, feeder, or sand screw disposed either between the hopper 55 and the corresponding outlet 30 or along the outlet 30.

At a later time, it may be desirable to switch from adding the first dry material 24A to adding the second dry material 24B for mixing with the bulk material in the blender unit 36. The discharge gate 54A may be closed and a discharge gate 54B on the corresponding compartment 22B of the modular container 20 may be opened, allowing the dry material 24B to flow from the container 20 into the respective outlet 30. The hopper 55B may feed the dry material 24B from the second compartment 22B directly into the corresponding outlet 30. The outlet 30 may then transfer and/or meter the dry material 24B to the blender unit 36 for mixing with the bulk material.

Although discussed as directing one type of dry material 24A or 24B from the modular container 20 to the blender unit 36 at a time, the system 10 may also be designed to provide two or more dry materials 24 to the blender unit 36 at the same time for mixing with the bulk material. To that end, the system 10 may include separate outlets 30 for each compartment 22 of the modular container 20 to route the desired materials 24A and 24B to the blender unit 36 at the same time so that they can then be mixed into the bulk material in a desired ratio at the blender unit 36.

After one or more of the containers 12 (or 20) on the support structure 14 are emptied, the empty containers 12 (or 20) may be removed from the support structure 14 via a hoisting mechanism. In some embodiments, the one or more empty containers 12 (or 20) may be positioned on another bulk storage system 50 (e.g., a skid, a pallet, or some other holding area) until they can be removed from the site and/or refilled. In other embodiments, the one or more empty containers 12 (or 20) may be positioned directly onto a transportation unit for transporting the empty containers 12 (or 20) away from the site. It should be noted that the same transportation unit used to provide one or more filled containers 12 (or 20) to the location may then be utilized to remove one or more empty containers 12 (or 20) from the site.

As illustrated, the containers 12 may each include a discharge gate 52 for selectively dispensing or blocking a flow of bulk material from the container 12. In addition, each compartment 22 of the modular container 20 may include a corresponding discharge gate 54 for selectively dispensing or blocking a flow of the dry material 24 from that compartment 22. In some embodiments, the discharge gates 52 and 54 may each include a rotary clamshell gate, as shown. However, other types of discharge gates 52 and 54 that can be actuated open and closed may be used. When the discharge gates 52 and 54 are closed (as shown on containers 12A, 12B, and compartments 22A and 22B of the modular container 20) the gates 52 and 54 may prevent bulk material/dry additive from flowing from the corresponding containers 12 and 20 to the outlets 18 and 30. The discharge gates 52 and 54 may be selectively actuated into an open position (as shown on container 12C) to release the bulk material/dry additive from the containers 12 and 20.

When rotary clamshell gates are used, this actuation may involve rotating the discharge gate 52 (or 54) about a pivot point relative to the container 12 (or compartment 22) to uncover an opening at the bottom of the container 12 (or compartment 22), thereby allowing bulk material (or dry additive) to flow through the opening and into the outlet 18 (or 30). When linearly actuated gates are used, this actuation may involve linearly translating the discharge gate 52 (or 54) relative to the container 12 (or compartment 22) to uncover the opening. When it is desired to stop the flow of bulk material/dry additive, or once the container 12 (or compartment 22) is emptied, the discharge gate 52 (or 54) may then be actuated (e.g., rotated or translated) back to the closed position to block the flow of bulk material/dry additive.

In some embodiments, the support structure 14 may include one or more actuators 56 used to actuate the discharge gates 52 and 54 of whatever containers 12 and 20 are positioned on the support structure 14. The one or more actuators 56 may be entirely separate from the containers 12 and 20 and their corresponding discharge gates 52 and 54. That is, the one or more actuators 56 and the discharge gates 52 and 54 may not be collocated on the same structure. The same actuators 56 may be used to open and/or close the discharge gates 52 and 54 of multiple containers 12 and 20 that are positioned on the support structure 14 over time. The one or more actuators 56 may be rotary actuators, linear actuators, or any other desired type of actuators for engaging and moving the discharge gates 52 and 54 of the containers 12 and 20 between closed and open positions. The actuators 56 may be automated and, in some instances, may allow for manual override of the automated system.

The support structure 14 may also include one or more indicators 58 (e.g., indicator lights) disposed on the support structure 14 for providing various information about the operating state of the support structure 14 and/or the containers 12 and 20 disposed thereon. For example, in the illustrated embodiment, the support structure 14 may include at least one indicator 58 corresponding to each actuator 56 on the support structure 14. The indicators 58 may include lights designed to indicate whether any discharge gates 52 and 54 of the containers 12 and 20 disposed on the bays 32 and 34 of the support structure 14 are in an open position or whether they are in a closed position, based on the operating state of the corresponding actuators 56.

Presently disclosed embodiments are directed to the use of the modular container 20 for holding and transporting multiple types of dry flowable material 24 about a work site. As mentioned above, the modular container 20 generally includes multiple compartments 22 for holding and keeping the multiple types of dry material 24 separate from each other while the modular container 20 is transported about the work site. The modular container 20 may be similar in size (e.g., having an approximately equivalent volume capacity) to the portable containers 12 used on location to supply bulk material to the blender unit 36. The modular container 20 may be positioned on the fourth bay 34 of the support structure 14, as shown, to supply multiple different types of dry material 24 to the blender unit 36 as needed from a single container 20.

The modular container 20 may have the same footprint as the bulk material containers 12, in order to enable efficient placement of either type of container 12 or 20 onto the frame 16 of the support structure 14 and in other locations about the job site. Keeping the two types of containers 12 and 20 with the same footprint may enable the containers 12 and 20 to be stacked atop one another at a bulk storage facility 50 or transportation unit.

As mentioned above, the compartments 22 of the modular container 20 may be equipped with similar discharge gates 54 to those used on the bulk material containers 12. For example, both types of containers 12 and 20 may utilize rotary clamshell gates 52 and 54 that are actuated via a similar rotary actuation mechanism (e.g., 56) on the support structure 14. In some embodiments, the compartments 22 on the modular container 20 may include smaller discharge openings than the bulk material containers 12, due to the shape and constraints of the compartments 22 and the outlet system 30 used to direct different dry materials 24 from the container 20 to the outlet location.

By adding the extra bay 34 to the frame 16 of the support structure 14 and utilizing the same type of hoisting mechanism, base structure actuators 56, and a similar container footprint, the efficiencies that are available for handling the containerized bulk material on location can be extended to handling multiple types of dry additive or other dry materials on location as well. The efficient, containerized system may be extended to other types of bulk material/dry additive transfer operations that are commonly used during fracturing operations, and in other contexts as well. The disclosed bulk material/dry additive handling system 10 provides a more efficient mechanism for providing dry additive to a blender than is currently available using large bags of dry additive simply dumped onto a metering screw.

The multiple compartment container 20 may capitalize on the efficiencies of moving a group of containers (i.e., compartments 22) as a single unit, since the compartments 22 are all secured onto a common base structure 26 with the same footprint as the containers 12. In addition, by using the disclosed modular container 20 having multiple compartments 22, the material handling system 10 may more quickly and easily switch between outputting different types of dry material to the blender unit 36 for mixing with liquid and bulk material from the other containers 12. The multi-compartment container 20 provides a reduction in the number of times a forklift driver would have to swap the container 20, since there are multiple different dry materials 24 within the connected capacity of the base structure 14.

Figure 2:
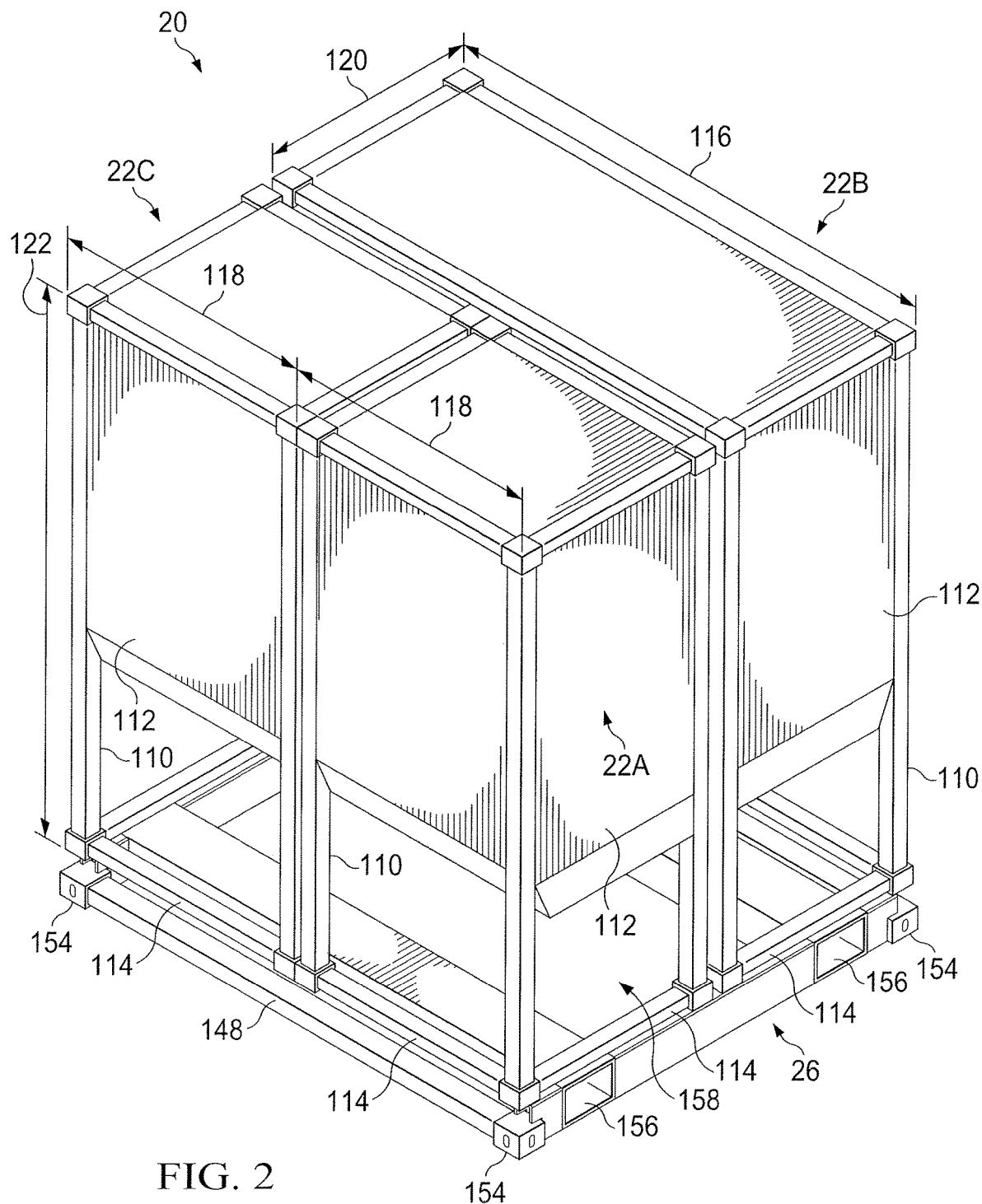
FIG. 2 is a perspective view of a portable modular container with multiple compartments for providing different types of dry material to the system of FIG. 1, in accordance with an embodiment of the present disclosure.

FIG. 2 illustrates one embodiment of the modular container 20 that may be utilized to hold and release different types of dry flowable material to the outlet on the support structure of FIG. 1. The different dry flowable materials held in the compartments 22 of the modular container 20 may each have different chemical properties. As described above, the modular container 20 includes multiple compartments 22 and a base structure 26. The multiple compartments 22 are removably secured to the base structure 26 so that the base structure 26 can be manipulated about the work site with the multiple compartments 22 supported on top of the base structure 26. In the illustrated embodiment, the modular container 20 includes three compartments 22. However, other numbers and arrangements of compartments 22 may be utilized to form the container 20.

The compartments 22 may each include a frame 110 and an enclosure 112 secured to the frame 110. As illustrated, the frame 110 of each compartment 22 may be formed along and/or secured to corners of the enclosure 112. A lower portion 114 of each frame 110 may be placed directly onto and mechanically connected to the base structure 26 of the modular container 20. In general, the compartments 22 may each have a rectangular prism shape that helps with the placement and arrangement of adjacent compartments 22 onto the same base structure 26.

In the illustrated embodiment, one compartment 22B on the base structure 26 of the container 20 may have a volume that is roughly twice the volume of the other two compartments 22A and 22C. The larger compartment 22B may have a width dimension 116 that is roughly twice a width dimension 118 of the other two compartments 22A and 22C. The other dimensions (length 120 and height 122) of the compartments 22 may each be approximately the same. That way, when placed on the base structure 26 as shown, the three compartments 22 may be disposed adjacent one another such that they generally cover the entire available footprint of the base structure 26. The frames 110 of the adjacent compartments 22 may be mechanically secured to one another to increase the stability of the modular container 20.

The enclosures 112 are designed to hold a dry material therein such that each compartment 22 is separate from the other compartments and fully enclosed. That way, the dry material in each compartment 22 is kept separate from the dry material in adjacent compartments 22, and no dry material can escape from the compartments 22 of the modular container 20 until a specified gate on the container 20 is opened. In the illustrated embodiment, the enclosures 112 of the compartments 22 may include walls made from a rigid material (e.g., metal or plastic) that are coupled together to form the enclosure 112. The walls of the enclosure 112 may be coupled together via welds or some other type of mechanical connection to form the corners of the enclosure 112. In other embodiments, the modular container 20 may utilize compartments 22 with a bag-type, semi-rigid, or laminate enclosure construction. As illustrated, the enclosure 112 may be funneled at the bottom to direct the flowable dry material toward an opening when the discharge gate for that compartment 22 is opened.

The modular container 20 may allow multiple dry flowable materials to be transported about a work site and moved as a single unit. This may be increasingly important as the proppant rate of the blender unit (e.g., 36 of FIG. 1) increases and a forklift driver has to move containers more efficiently. In addition, the transported dry materials disposed in the fully enclosed compartments 22 may be better protected from the elements and potential loss of product, as compared to existing dry additive methods where a bag can be accidently ripped or punctured during movement about the work site. The disclosed modular container 20 may provide the ability to run larger volumes of multiple dry additives than is currently available in bulk material handling systems, due to the multiple compartments 22. Furthermore, a blender operator may be able to focus more attention on the equipment and processes of the blender unit, rather than spending time and energy cutting sacks of dry additive to dispense into a blender hopper.

Figure 3:
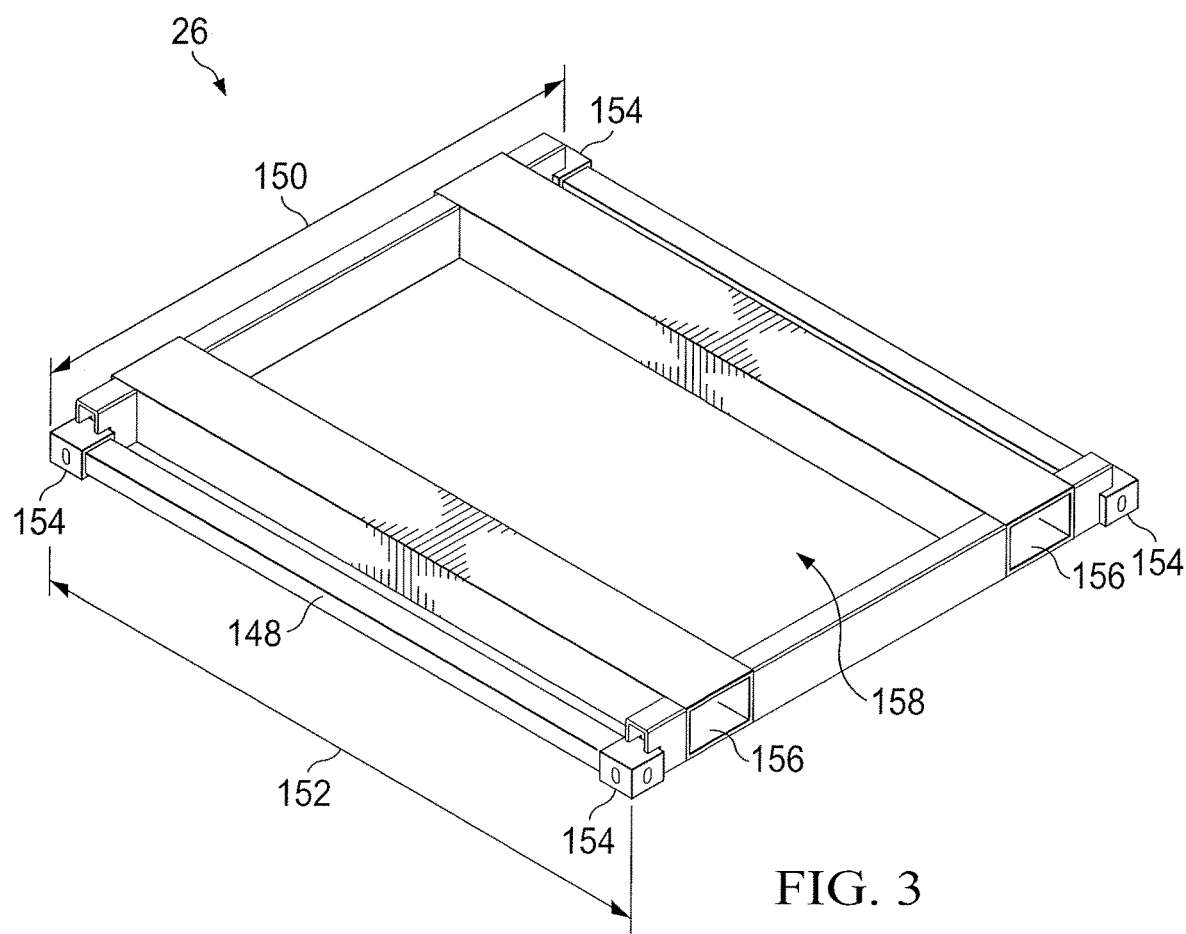
FIG. 3 is perspective view of a container base that can be configured with multiple compartments to form a portable modular container for handling dry materials, in accordance with an embodiment of the present disclosure.

As described above, the modular container 20 may have a base structure 26 that is designed with the same base or footprint size as other containers (e.g., 12 of FIG. 1) used for transporting just a single type of bulk material on location. FIG. 3 illustrates an embodiment of the container base structure 26 that may be used for the modular container 20. As shown, the base structure 26 may generally include a perimeter frame 148 defining the footprint of the modular container 20. The frame 148 may support the compartments later positioned thereon. The base structure 26 enables the placement and movement of multiple bins of material within a single container envelope defined by the frame 148. The base structure 26 may have the same area dimensions (length 150 and width 152) as the non-modular containers (e.g., 12) used on location.

The base structure 26 may include features that allow that modular container (e.g., 20 of FIG. 2) to interact with various equipment (e.g., support structure, forklift, etc.) in ways similar to the non-modular containers (e.g., 12) used on location. For example, the base structure 26 may include interfacing features that allow the modular container (e.g., 20) to be mounted onto the support structure (e.g., 14 of FIG. 1) and held in position on the support structure in the same manner as the other containers (e.g., 12). Specifically, the base structure 26 may include ISO corners 154 at each of the four corners of the base structure 26 designed to interface with corresponding locator pins on the support structure (e.g., 14). The non-modular containers (e.g., 12) may also include ISO corners for interfacing with the support structure (e.g., 14) in the same manner. In addition, the base structure 26 may include forklift pockets 156 to facilitate easy movement of the completed modular container (e.g., 20) around the location. The non-modular containers (e.g., 12) may include similar forklift pockets along their bases as well.

The base structure 26 may provide a relatively open space 158 extending between the frame 148 and between the forklift pockets 156. This space 158 may allow dry material released from the compartments (e.g., 22) disposed on the base structure 26 to flow into a hopper (e.g., 55) or other component of the outlet (e.g., 30) for routing the dry material to the blender unit.

Turning back to FIG. 2, the compartments 22 that form the modular container 20 may be mechanically fastened to the frame 148 of the base structure 26 through the use of ISO locks or another mechanical locking mechanism. Before being locked onto the base structure 26, the individual compartments 22 may each be filled with dry material and independently set in a storage warehouse or similar storage location. The compartments 22 of dry material may later be loaded and locked onto the base structure 26 at a field camp or distribution point for the dry additive to form the complete modular container 20. The modular container 20 may then be transported to the work site where it can be moved as a single unit, e.g., onto the support structure for emptying into the blender.

The exact configuration of the compartments 22 disposed on the base structure 26 to form the modular container 20 may vary depending on the desired types and amount of dry additive or other dry material required for a blending operation. For example, as shown in FIG. 2, the modular container 20 may include two smaller "quarter-sized" compartments 22A and 22C (i.e., taking up one quarter of the total support area of the base structure 26) and one larger "half-sized" compartment 22B (i.e., taking up one half of the total support area of the base structure 26). However, the same base structure 26 could instead be fitted with two "half-sized" compartments 22D and 22E, as shown in an embodiment of the modular container 20 in FIG. 4. It should be noted that any other combination of numbers or sizes of compartments 22 may be arranged on the base structure 26 to foam the modular container 20. For example, the modular container 20 may include four "quarter-sized" compartments, or even a greater number of smaller compartments arranged adjacent one another on the base structure 26.

Figure 4:
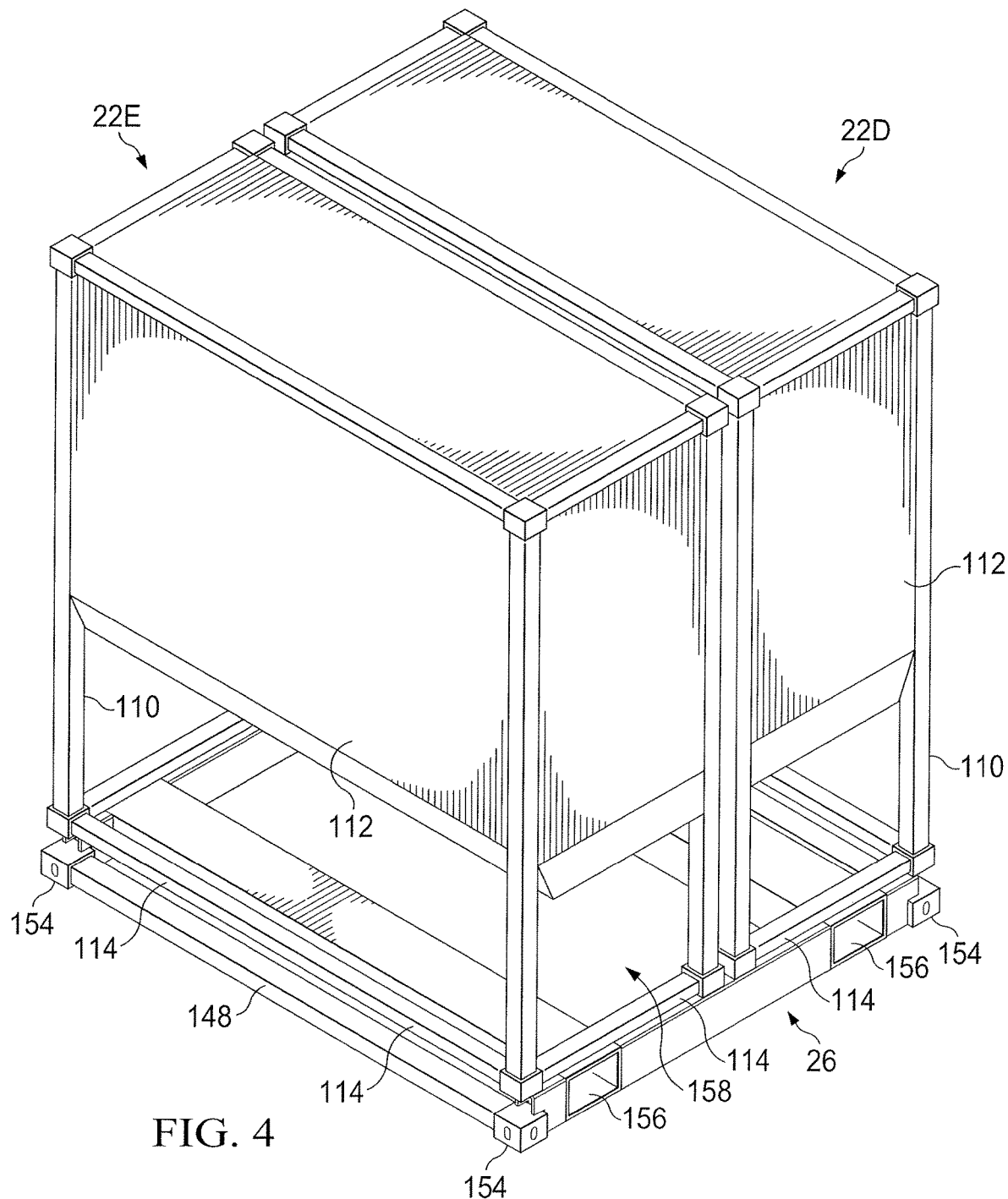
FIG. 4 is a perspective view of a portable modular container with multiple compartments, in accordance with an embodiment of the present disclosure.

The modular container 20 may be configurable to include any desired arrangement of compartments (e.g., compartment sizes and number of compartments) to account for the different types and the amount of dry materials that are needed based on the blender job design. For example, a custom blender job may utilize certain ratios of different chemical dry additives to be mixed into the bulk material at different times. The modular container 20 may be initially put together with compartments 22 holding different dry materials in a combination that enables the correct ratio of the dry materials needed for the custom blender job. For example, if the blender job calls for approximately equal volumes of two dry materials to be provided to the blender, the modular container 20 may be loaded out with two "half-sized" compartments 22D and 22E (as shown in FIG. 4), each holding a different dry material. If the blender job calls for three types of dry material with one dry material being run at a higher concentration than the other two, the modular container 20 may be loaded out with two "quarter-sized" compartments 22A and 22C and one "half-sized" compartment 22B (as shown in FIG. 2), each holding a different dry material. Each of the compartments 22 of the modular container 20 may be interchangeable with one or more different compartments 22 of dry material. This allows the modular container 20 to be fully customizable before transportation to and use at the work site.

In general, relatively smaller quantities of dry additive are needed for a predetermined blender job as compared to the bulk material into which the dry additive is being mixed via the blender. Accordingly, the smaller quantity compartments 22 on the modular container 20 may supply a total amount of each of the multiple dry additives (or other dry materials) needed for the blender job while the system may cycle through multiple containers 12 worth of bulk material. For example, to supply the treatment fluid for one fracturing stage, the blender unit may utilize 15 or more containers 12 of bulk material along with one modular container 20 of dry additive.

Figure 5:
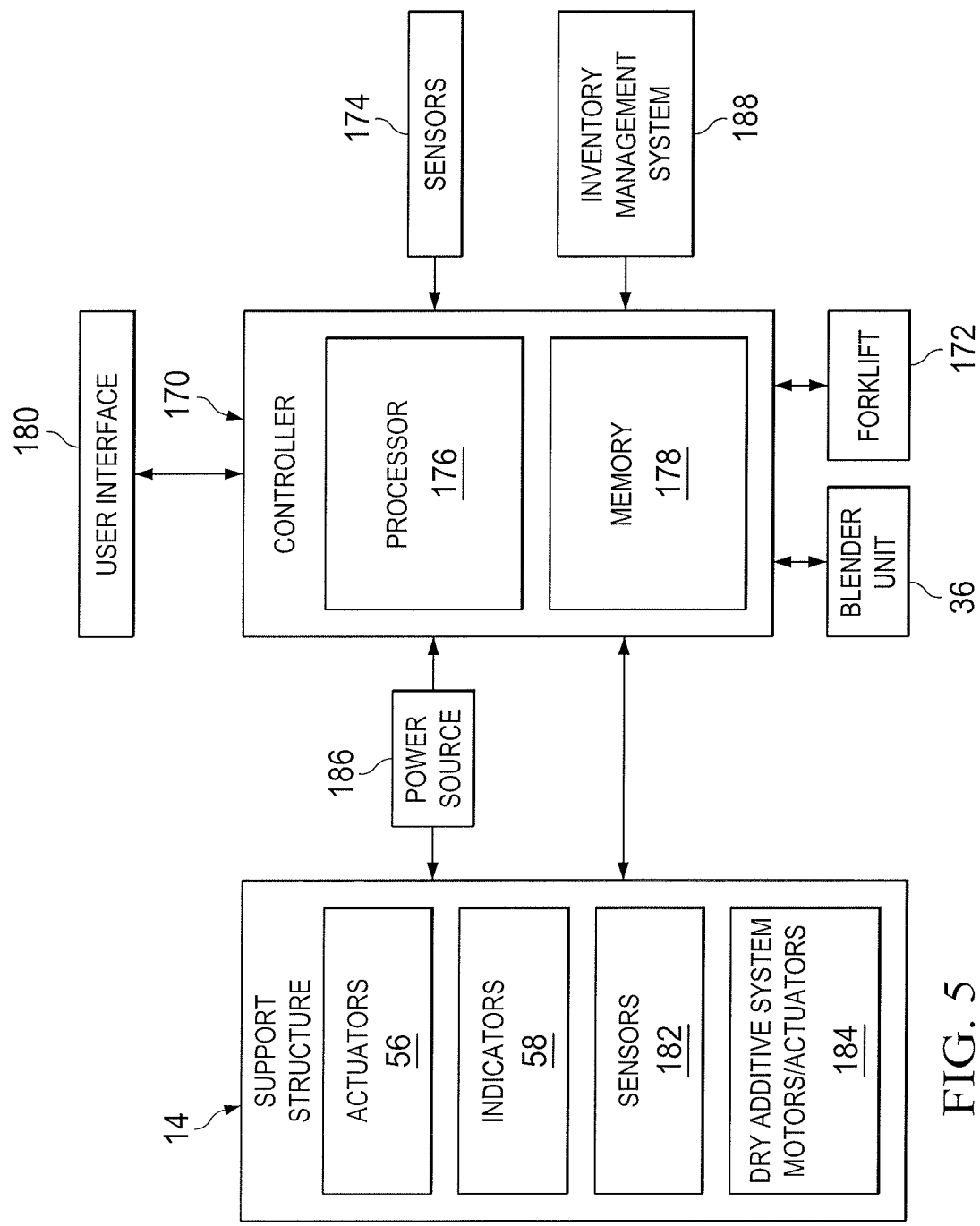
FIG. 5 is a schematic block diagram of an embodiment of a support structure with electronics that are communicatively coupled to a control system, in accordance with an embodiment of the present disclosure.

FIG. 5 is a block diagram illustrating various electronic and control components that may be used throughout a well site with the disclosed support structure 14 for discharging dry materials from the modular container 20 as well as bulk material from other containers 12. The support structure 14 may include a number of electronic components, and these components may be communicatively coupled (e.g., via a wired connection or wirelessly) to one or more controllers 170 (e.g., automated control system) at the well site. The control system 170 may be communicatively coupled to several other well site components including, but not limited to, the blender unit 36, a hoisting mechanism (e.g., forklift) 172, and various sensors 174.

The control system 170 utilizes at least a processor component 176 and a memory component 178 to monitor and/or control various operations and inventory at the well site. For example, one or more processor components 176 may be designed to execute instructions encoded into the one or more memory components 178. Upon executing these instructions, the processors 176 may provide passive logging of the operational states of one or more components at the well site, as well as the amount, type, and location of bulk material/dry additives at the well site. In some embodiments, the one or more processors 176 may execute instructions for controlling operations of certain well site components (e.g., support structure electronics). This may help to control sequencing of discharge gates on the bulk material containers and modular containers, metering of dry additive into the blender, and other operations related to material transfer at the well site.

As shown, the controller 170 may be coupled to a user interface 180, which enables an operator to input instructions for execution by the control system 170. The user interface 180 may also output data relating to the operational state of the bulk material/dry additive handling system.

As shown, the control system 170 may be communicatively coupled to a number of sensors 174 disposed on the support structure 14 and/or about the well site. Based on feedback from these sensors 174, the control system 170 may determine when to actuate discharge gates to switch between different bulk material containers and dry additive compartments that are positioned on the support structure 14. The control system 170 may also be communicatively coupled to a number of controllable components disposed on the support structure 14, the blender unit 36, and/or the forklift 172. The control system 170 may actuate certain of these controllable components based on sensor feedback.

The support structure 14 may include a number of electronic components such as, for example, the automated actuators 56 described above with reference to FIG. 1. These actuators 56 may be controlled to open and/or close a discharge gate of one or more containers (or compartments of the modular container) elevated on the support structure 14. The support structure 14 may also include one or more indicators 58 (e.g., indicator lights) disposed on the support structure for providing various information about the operating state of the support structure 14.

In addition, the support structure 14 may include various sensors 182 (e.g., fill level sensors, cameras, load cells, etc.) designed to take measurements and provide sensor feedback to the control system 170. The sensors 182 may be used to detect levels of bulk material and dry additive present in the hopper and/or output chutes, information regarding the number of containers disposed on the support structure 14, as well as the fill level of bulk material or dry additive within the individual containers or compartments on the support structure 14. The control system 170 may actuate the discharge gates on different containers with precisely controlled timing based on the received sensor feedback.

As part of these sensors 182, the support structure 14 may include one or more load cells on the fourth bay 34 used to detect loads from the modular container 20. In embodiments where the gate actuators 56 are controlled to release dry material from just one compartment 22 of the modular container 20 at a time, a single load cell may be utilized to determine the net change in load from the modular container 20. The control system 170 may utilize this load change, along with information regarding which compartment is open based on the position of the gate actuators 56, to determine the change in the amount of dry material that has been discharged from each compartment 22 of the modular container 20. In embodiments where the gate actuators 56 are controlled to release dry material from multiple compartments 22 of the modular container 20 at the same time, individual load cells corresponding to each compartment 22 on the modular container 20 may be utilized on the support structure 14.

Further, the support structure 14 may include one or more dry additive system motors and/or actuators (e.g., controllable gates) 184 used to meter dry additives from one or more compartments 22 of the modular container 20 on the support structure 14 to an outlet location at a predetermined rate. The control system 170 may actuate these various motors/actuators 184 to provide the desired type and amount of dry additive for mixing with the bulk material based on, for example, a known treatment schedule. This may involve adjusting a speed of the motor operating the conveying device of the dry additive outlet system, opening or closing gates at certain locations within the dry additive outlet system, or a combination thereof.

The controller 170, the support structure electronics, or both, may utilize power from an external power source 186, as shown. In other embodiments, the support structure 14 may include its own power source 186 for operating the onboard electronics and sensors.

The sensors 174 may include one or more load cells or bin full switches for tracking a level of bulk material or dry additive in a portable container or a modular container compartment and indicating whether the container or compartment is empty, full, or partially full. Such sensors 174 may be used for any given container or modular container compartment, one or more blender hoppers, a silo (not shown), a forklift, or any other component at the well site.

In some embodiments, the controller 170 may be communicatively coupled to an inventory management system 188 that monitors the inventory of bulk material and different dry additives on location. Operation of such an inventory management system 188 is described in greater detail in PCT Application No. PCT/US2015/061618. The inventory management system 188 may include a separate control/monitoring system or may be incorporated into the controller 170. The inventory management system 188 may track bulk material inventory and dry additive inventory on location through the use of RFID technology or other identification tracking techniques. Each portable container and each modular container compartment may feature an identification component (e.g., RFID tag) used to provide an indication of the particle size, bulk volume, weight, type, material, and/or supplier of the bulk material or dry additive present in the container or compartment. In some embodiments, the identification components may be rewritable such that the bulk material or dry additive inventory of individual containers or compartments can be updated after discharging a portion of its contents at the support structure 14. The inventory management system 188 may be communicatively coupled to an RFID reader disposed in proximity to the containers being moved about the well site.

The controller 170 may provide control signals to the actuators 56 used to open and/or close the container/compartment discharge gates with appropriate timing for maintaining a steady supply of bulk material and dry additive to the blender unit 36. In some embodiments, an operator may use the user interface 180 to manually sequence and initiate gate actuations of any desirable bulk material containers or dry additive compartments (of the modular container) on the support structure 14. Additional manual override techniques may also be available using, for example, manual hydraulic, pneumatic, or mechanical controls.

Although the present disclosure and its advantages have been described in detail, it should be understood that various changes, substitutions and alterations can be made herein without departing from the spirit and scope of the disclosure as defined by the following claims.

What is claimed is:

1. A system, comprising:
a support structure;
a portable container of bulk material disposed on a first bay of the support structure;
a portable modular container disposed on a second bay of the support structure, wherein the modular container comprises:
a base structure; and
a plurality of compartments each filled with a different dry material, wherein each of the plurality of compartments is fully enclosed, wherein the plurality of compartments are disposed adjacent each other and removably secured to the base structure, and wherein the base structure supports the plurality of compartments;
a first outlet coupled to the first bay for routing bulk material from the portable container to a first inlet of a blender, wherein the first inlet is a hopper of the blender; and
at least one second outlet coupled to the second bay, wherein the at least one second outlet is separate from the first outlet and routes the different dry materials from the plurality of compartments of the modular container to a second inlet of the blender, wherein the second inlet is separate from the hopper and located at a position in the blender downstream of the hopper with respect to a direction of flow of material through the blender.

2. The system of claim 1, wherein the at least one second outlet comprises a plurality of outlets coupled to the second bay, wherein each of the plurality of outlets routes the dry material from a corresponding one of the plurality of compartments of the modular container to the second inlet of the blender.

3. The system of claim 2, wherein each of the plurality of outlets comprises a metering device for metering the dry material from a corresponding one of the plurality of compartments of the modular container to the second inlet of the blender.

4. The system of claim 1, wherein each of the plurality of compartments secured to the base structure is interchangeable with one or more different sized compartments that are fully enclosed.

5. The system of claim 1, wherein the modular container further comprises a plurality of gates each disposed on a lower surface of a corresponding one of the plurality of compartments; and
wherein the support structure comprises a plurality of gate actuators disposed along the second bay of the support structure, wherein each of the plurality of gate actuators is controllable for selectively opening or closing a corresponding one of the plurality of gates on the modular container.

6. The system of claim 1, wherein a footprint of the base structure of the modular container is approximately equivalent to a footprint of the portable container of bulk material.

7. The system of claim 1, wherein the first outlet is coupled to the first bay for routing bulk material from the portable container directly to the blender.

8. The system of claim 1, wherein the second blender inlet is a dry material inlet to a mixer of the blender, wherein a metering mechanism is disposed between the hopper and the dry material inlet of the mixer.

9. The system of claim 1, wherein the plurality of compartments are each locked directly to the base structure.

10. The system of claim 1, wherein the plurality of compartments each comprise a frame and an enclosure supported in the frame, wherein a bottom portion of the frame is removably coupled to the base structure.

11. The system of claim 1, wherein the base structure of the modular container comprises forklift pockets.

12. The system of claim 1, wherein one or more of the plurality of compartments is sized to cover half of a total support area of the base structure of the modular container.

13. The system of claim 1, wherein one or more of the plurality of compartments is sized to cover a fourth of a total support area of the base structure of the modular container.

14. The system of claim 1, wherein at least part of a metering mechanism is disposed between the hopper and the second inlet of the blender.

15. A method, comprising:
constructing a modular container by:
securing a first compartment to a base structure, the first compartment being fully enclosed and holding a first dry material; and
securing a second compartment to the base structure adjacent the first compartment, the second compartment being separate from the first compartment, fully enclosed, and holding a second dry material different from the first dry material; and
transporting the modular container by supporting and moving the base structure, wherein the base structure supports the first and second compartments;
positioning the modular container onto a bay of a support structure, the support structure having another bay upon which a portable container of bulk material is positioned;
the support structure comprising:
a first outlet coupled to the other bay for routing bulk material from the portable container to a first inlet of a blender, wherein the first inlet is a hopper of the blender; and
at least one second outlet coupled to the bay, wherein the at least one second outlet is separate from the first outlet and routes the different dry materials from the first and second compartments of the modular container to a second inlet of the blender, wherein the second inlet is separate from the hopper and located at a position in the blender downstream of the hopper with respect to a direction of flow of material through the blender.

16. The method of claim 15, further comprising securing the first compartment and the second compartment to the base structure via ISO locks.

17. The method of claim 15, wherein at least part of a metering mechanism is disposed between the hopper and the second inlet of the blender.

18. A method, comprising:
receiving a portable container of bulk material onto a first bay of a support structure;
receiving a portable modular container onto a second bay of the support structure,
wherein the modular container comprises:
a base structure; and
a plurality of compartments each filled with a different dry material, wherein each of the plurality of compartments is fully enclosed, wherein the plurality of compartments are disposed adjacent each other and removably secured to the base structure, and wherein the base structure supports the plurality of compartments;

routing bulk material from the portable container to a first inlet of a blender via a first outlet coupled to the first bay of the support structure; and routing the different dry materials from the plurality of compartments of the modular container to a second inlet of the blender via at least one second outlet coupled to the second bay of the support structure;

wherein the at least one second outlet is separate from the first outlet;

wherein the first inlet is a hopper of the blender; and wherein the second inlet of the blender is separate from the hopper and located at a position in the blender downstream of the hopper with respect to a direction of flow of material through the blender.

19. The method of claim 18, further comprising:

actuating a first discharge gate disposed along a bottom surface of a first one of the plurality of compartments to release a first dry material toward the at least one second outlet; and actuating a second discharge gate disposed along a bottom surface of a second one of the plurality of compartments to release a second dry material toward the at least one second outlet.

20. The method of claim 18, wherein at least part of a metering mechanism is disposed between the hopper and the second inlet of the blender.

* * * * *